(12) United States Patent
Wu

(10) Patent No.: US 8,474,838 B1
(45) Date of Patent: Jul. 2, 2013

(54) HIDDEN BRAKING DEVICE

(76) Inventor: Ching-Tsang Wu, Xinbei (TW)

( * ) Notice: Subject to any disclaimer, the term of this patent is extended or adjusted under 35 U.S.C. 154(b) by 0 days.

(21) Appl. No.: 13/406,173

(22) Filed: Feb. 27, 2012

(30) Foreign Application Priority Data

Feb. 16, 2012 (TW) .............................. 101202819 A

(51) Int. Cl.
*B62M 1/00* (2010.01)
(52) U.S. Cl.
USPC ........................................ 280/87.041; 188/19
(58) Field of Classification Search
USPC ............ 280/638, 641, 87.01, 87.021, 87.041, 280/87.05, 47.131, 47.17, 47.2, 47.34; 188/19, 188/20, 22; 135/65, 67, 75; 74/489, 502.2
See application file for complete search history.

(56) References Cited

U.S. PATENT DOCUMENTS

| | | | |
|---|---|---|---|
| 5,348,336 A * | 9/1994 | Fernie et al. .................. | 280/641 |
| 5,716,063 A * | 2/1998 | Doyle et al. ................ | 280/87.05 |
| 6,032,765 A * | 3/2000 | Hsi-Chia ......................... | 188/19 |
| 6,442,797 B1* | 9/2002 | Yang et al. ................... | 16/113.1 |
| 6,453,921 B1* | 9/2002 | Rost ................................. | 135/67 |
| 7,370,734 B2* | 5/2008 | Hallgrimsson ................ | 188/31 |
| 7,410,179 B2* | 8/2008 | Lonkvist .................. | 280/47.371 |
| 7,647,754 B2* | 1/2010 | Velke et al. .................... | 56/10.8 |
| 7,802,659 B2* | 9/2010 | Huang ............................ | 188/19 |
| 8,083,239 B2* | 12/2011 | Liu .................................. | 280/42 |
| 8,251,380 B2* | 8/2012 | Liu ............................ | 280/47.34 |
| 8,267,412 B2* | 9/2012 | Liu ............................ | 280/47.34 |
| 2004/0020322 A1* | 2/2004 | Hsieh .......................... | 74/502.2 |
| 2006/0237935 A1* | 10/2006 | Lonkvist ................. | 280/87.021 |
| 2007/0023073 A1* | 2/2007 | Su .................................. | 135/67 |
| 2007/0151400 A1* | 7/2007 | Huang ........................... | 74/532 |
| 2008/0047785 A1* | 2/2008 | Huang ...................... | 188/24.18 |
| 2010/0025124 A1* | 2/2010 | Arpino ........................ | 180/19.3 |
| 2010/0083994 A1* | 4/2010 | Liu .................................. | 135/67 |
| 2011/0140394 A1* | 6/2011 | Willis et al. .................. | 280/639 |
| 2011/0260421 A1* | 10/2011 | Willis ..................... | 280/87.041 |
| 2012/0286488 A1* | 11/2012 | Liu ............................ | 280/47.34 |
| 2012/0299272 A1* | 11/2012 | Liu .............................. | 280/651 |

* cited by examiner

*Primary Examiner* — John R Olszewski
*Assistant Examiner* — Brodie Follman
(74) *Attorney, Agent, or Firm* — Muncy, Geissler, Olds & Lowe, PLLC

(57) ABSTRACT

A hidden braking device installed on an adjustable walking aid has a connecting unit installed in the walking aid. The connecting unit has an upper shaft connecting to a braking grip, a lower shaft connected to a braking unit, an adjusting seat fixed to the lower shaft for the upper shaft to penetrate, a moving member slidably disposed in the adjusting seat for propelling the upper shaft, and a fastening unit disposed out of the walking aid, corresponding to the moving member. In adjusting the height of the walking aid, the fastening unit utilizes its magnetic attraction to control the moving member. The moving member is influenced to engage with one fixing slot defined on the upper shaft. The height of the walking aid and the length of the connecting unit are concurrently adjusted, which increases the operational convenience.

6 Claims, 6 Drawing Sheets

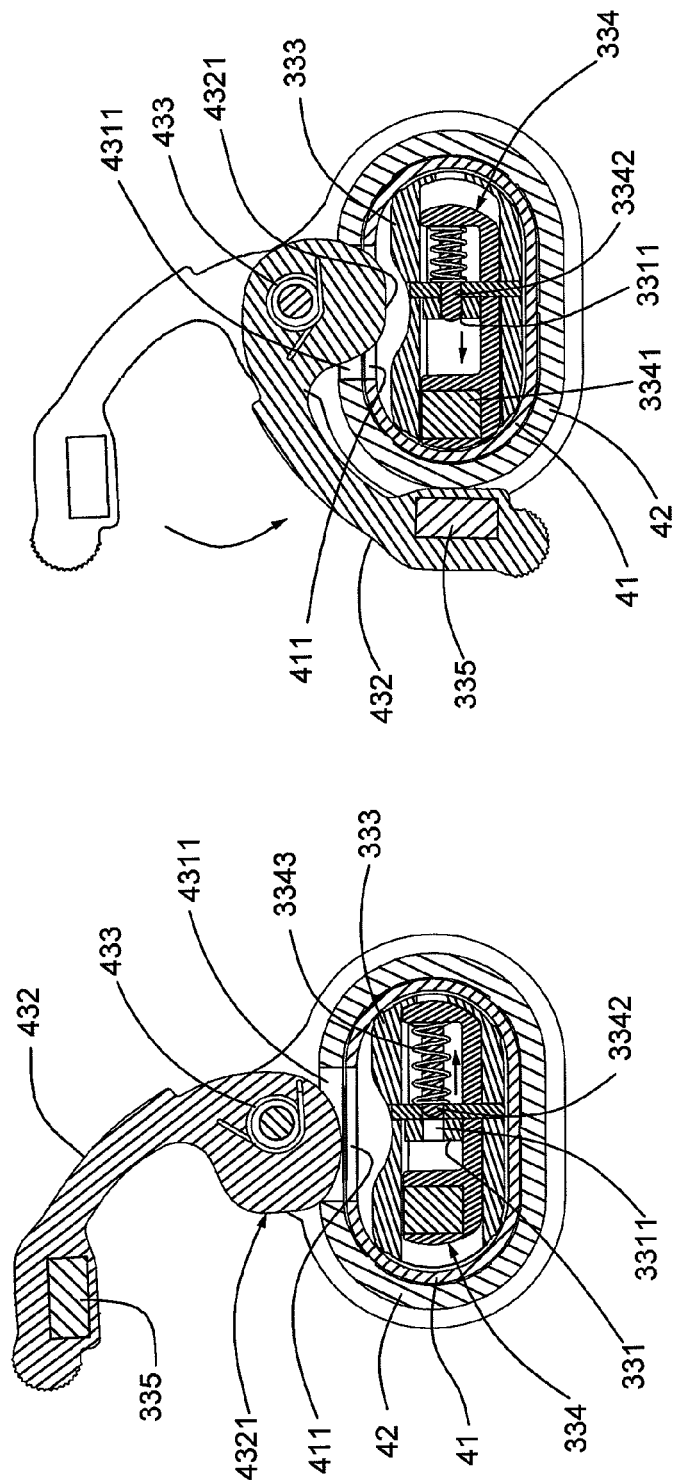

HIDDEN BRAKING DEVICE

1. FIELD OF THE INVENTION

The present invention relates to a braking device, particularly to a hidden braking device installed on an adjustable walking aid.

2. DESCRIPTION OF THE RELATED ART

Referring to FIG. 1, a conventional braking device 1 has a braking grip 11, a braking unit 12 for controlling the rolling of the wheel set A, and a braking wire 13 connecting the braking grip 11 with the braking unit 12. In operation, the braking grip 11 is pulled for causing the braking wire 13 to control the braking unit 12, so that the rolling state of the wheel set A would be timely influenced. Accordingly, the moving speed of the wheel set A lessens or the moving wheel set A stops.

In practice, the braking wire 13 has to be designed with a certain length while it is applied in an adjustable walking aid 2. Accordingly, when the walking aid 2 is extended, the braking wire 13 could be suited. However, if the walking aid 2 is not extended, the spare braking wire 13 protrudes easily, which may entangle with other objects and then be damaged. Apparently, even if the walking aid 2 is adjustable, the utilization is in fact inconvenient.

SUMMARY OF THE INVENTION

It is therefore the purpose of this invention to provide a hidden braking device installed on an adjustable walking aid for users to rapidly adjust the height of the walking aid, thereby allowing an easy and convenient operation to be achievable.

The hidden braking device in accordance with the present invention is installed on an adjustable walking aid. The braking device includes a braking grip, a braking unit controlling a rolling state of a wheel set, and a connecting unit connecting the braking grip with the braking unit. Wherein, the connecting unit is disposed inside the walking aid, and the walking aid has an upper frame and a lower frame that are suited to each other. The connecting unit has an upper shaft connected to the braking grip, a lower shaft connected to the braking unit, an adjusting seat connecting the upper shaft with the lower shaft, a moving member slidably disposed in the adjusting seat, and a fastening unit disposed out of the walking aid, correspondent with the moving member. A plurality of fixing slots are equidistantly defined on the upper shaft for satisfying an insertion of the moving member. One end of the moving member is provided with a magnetic member, and the other end of the moving member is provided with a propelling member which is disposed relative to the fixing slots. The fastening unit is magnetic for attracting the magnetic member, thereby allowing the moving member to displace and for making the propelling member steadily insert and fix on any of the fixing slots.

Preferably, a plurality of limiting slots are equidistantly defined on the upper frame, and an adjusting unit is disposed on the lower frame; the adjusting unit has a body that is disposed on the lower frame and provided with an accommodating room, a lodging member pivoted to the body within the accommodating room, and a second spring disposed on the moving member; the lodging member has a block mounted thereon, and a chamber defined thereon for receiving the fastening unit; swinging the lodging member allows the block to protrude toward the accommodating room and one of the limiting slots so as to fix the adjustable walking aid; the fastening unit move to a place directing to the magnetic member of the moving member.

Preferably, a first spring is disposed between the propelling member and the fixing slots.

Preferably, a plurality of positioning valleys are equidistantly defined on the upper shaft; an elastic positioning member is disposed on the adjusting seat for being able to partially protrude into one of the positioning valleys when the propelling member steadily inserts and fixes on any of the fixing slots.

Accordingly, when the walking aid is telescopically adjusted, the connecting unit is correspondingly regulated, thereby increasing the operational convenience.

BRIEF DESCRIPTION OF THE DRAWINGS

FIGS. 9 to 10 are schematic views showing the second preferred embodiment in operation.

DETAILED DESCRIPTION OF THE PREFERRED EMBODIMENTS

Figure 1:
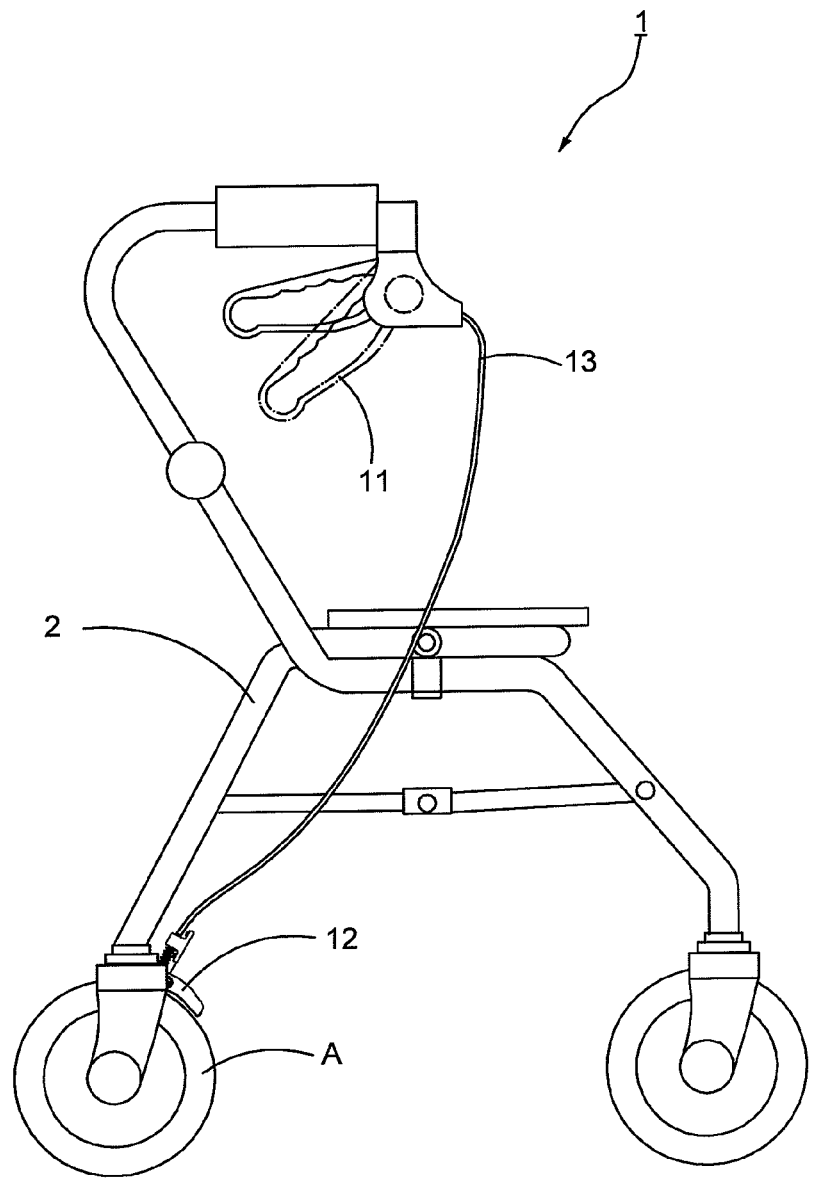
FIG. 1 is a schematic view showing a conventional walking aid.

Wherever possible, the same reference numbers are used in the drawings and the description to refer to the same or like parts.

Figure 3:
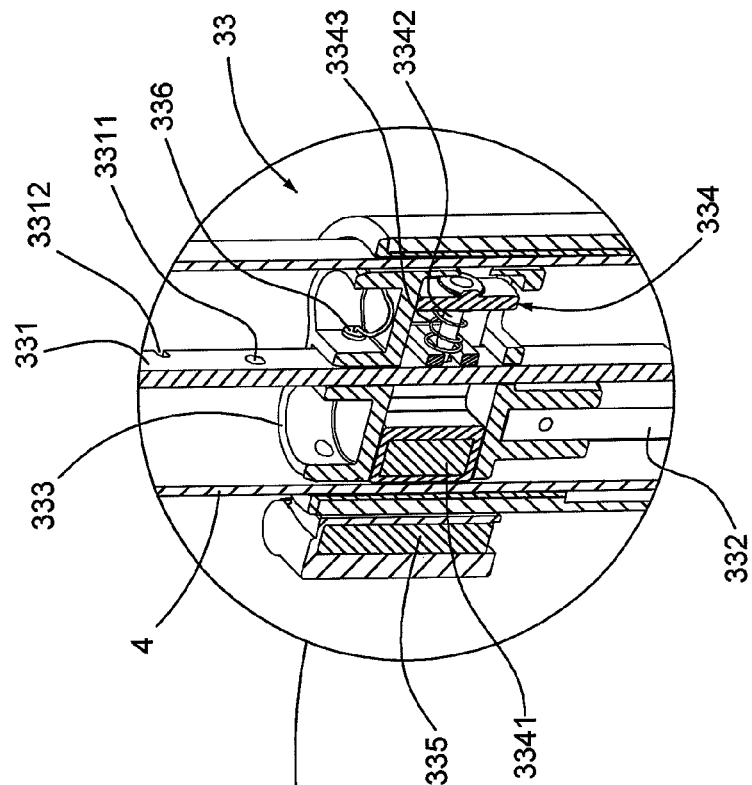
FIG. 3 is a partially cross-sectional view of FIG. 2.
Figure 2:
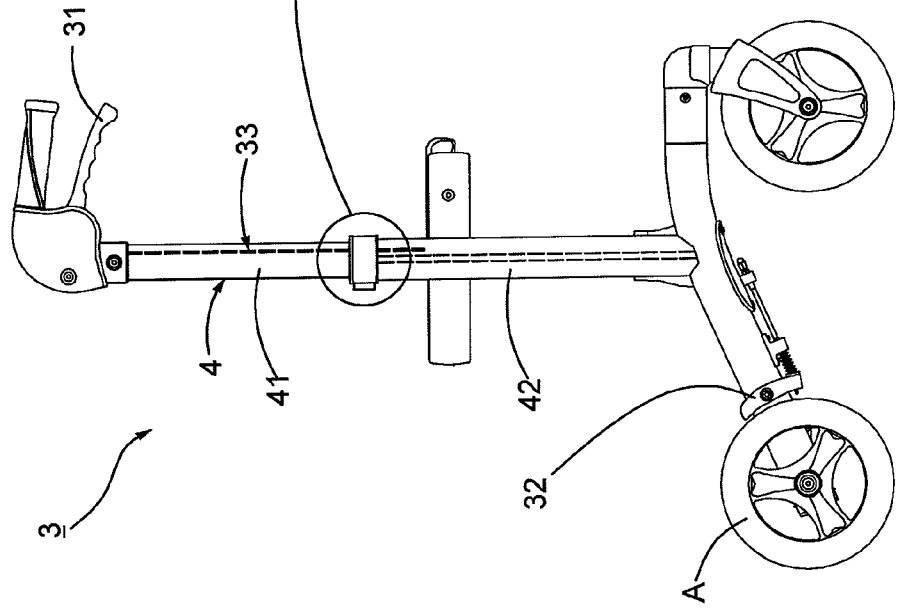
FIG. 2 is a perspective view showing a first preferred embodiment of the present invention.
Figure 4:
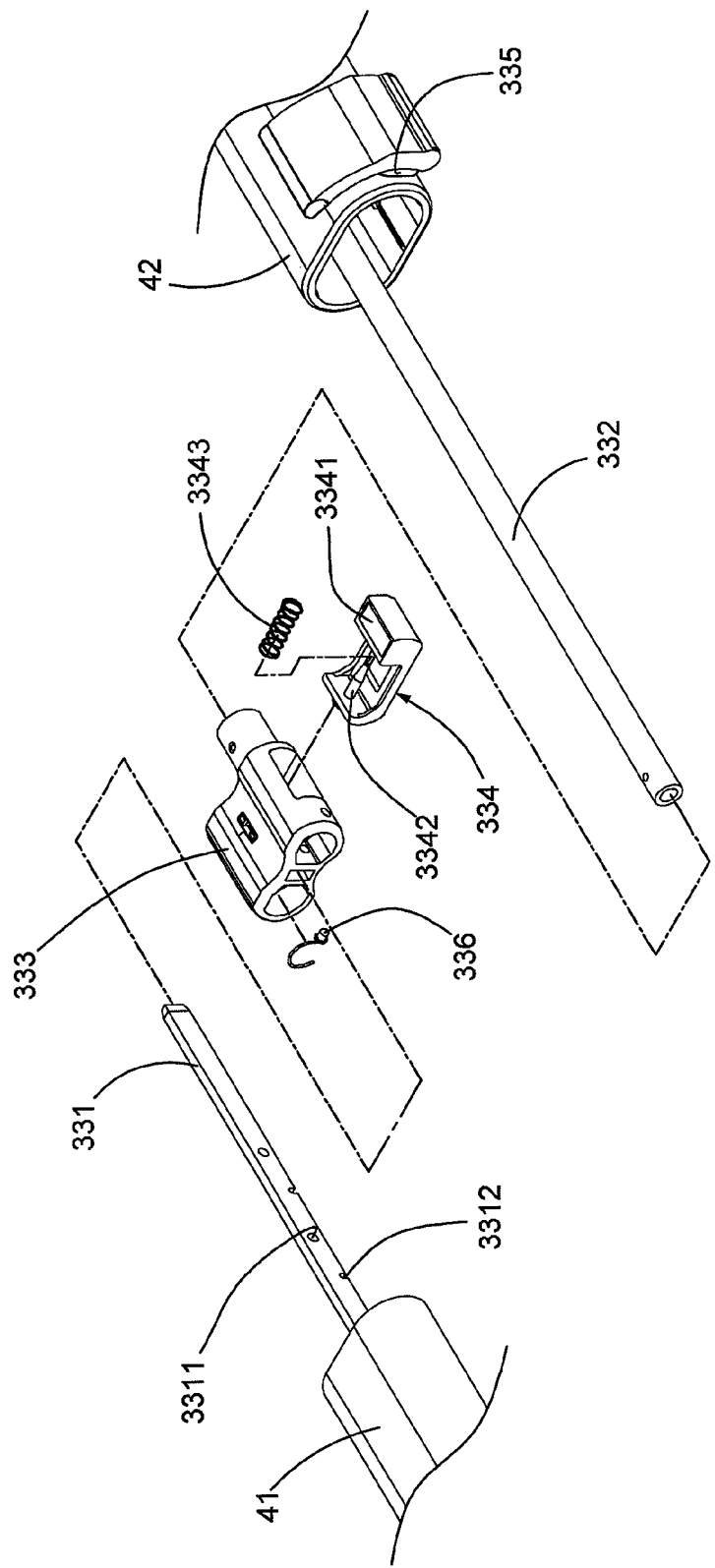
FIG. 4 is a partially exploded view of the first preferred embodiment of the present invention.

Referring to FIG. 2, a first preferred embodiment of the present invention is shown. A hidden braking device 3 is installed on an adjustable walking aid 4 that has an upper frame 41 and a lower frame 42 suited to each other. The hidden braking device 3 includes a braking grip 31, a braking unit 32 controlling a rolling state of a wheel set A, and a connecting unit 33 installed in the walking aid 4 connecting the braking grip 31 with the braking unit 32. Referring to FIGS. 3 and 4, the connecting unit 33 has an upper shaft 331 connected to the braking grip 31, a lower shaft 332 connected to the braking unit 32, an adjusting seat 333 connecting the upper shaft 331 with the lower shaft 332, a moving member 334 slidably disposed in the adjusting seat 333, and a fastening unit 335 disposed out of the walking aid 4, correspondent with the moving member 334. A plurality of fixing slots 3311 are equidistantly defined on the upper shaft 331 for satisfying an insertion of the moving member 334.

Continuingly, one end of the moving member 334 is provided with a magnetic member 3341, and the other end of the moving member 334 is provided with a propelling member 3342 which is disposed relative to the fixing slots 3311. The fastening unit 335 is magnetic for attracting the magnetic member 3341. In addition, in this embodiment, in order to make the propelling member 3342 automatically depart from the fixing slots 3311 when the moving member 334 leaves the attraction of the fastening unit 335, a first spring 3343 is disposed between the propelling member 3342 and the fixing slots 3311. Whereby, the first spring 3343 offers the elasticity to prop the propelling member 3342 and then allow the propelling member 3342 to depart from the fixing slots 3311.

Additionally, in order to realize whether the propelling member 3342 is precisely protruded into any of the fixing slots 3311 or not, a plurality of positioning valleys 3312 are equidistantly defined on the upper shaft 331, and an elastic positioning member 336 is disposed on the adjusting seat 333 for being able to partially protruded into one of the positioning valleys 3312 when the propelling member 3342 steadily inserts and fixes on any of the fixing slots 3311. Accordingly, when the upper shaft 331 is moved, the positioning member 336 is influenced along with the upper shaft 331 and repeatedly engaged or departed from the positioning valleys 3312. When the adjustable walking aid 4 is adjusted to a proper height, the positioning member 336 stretches into one of the positioning valleys 3312 with a slight striking sound. Whereby, users can realize that the propelling member 3342 is precisely positioned in one of the fixing slots 3311 by the striking sound, and the upper shaft 331 is properly adjusted.

Figure 6:
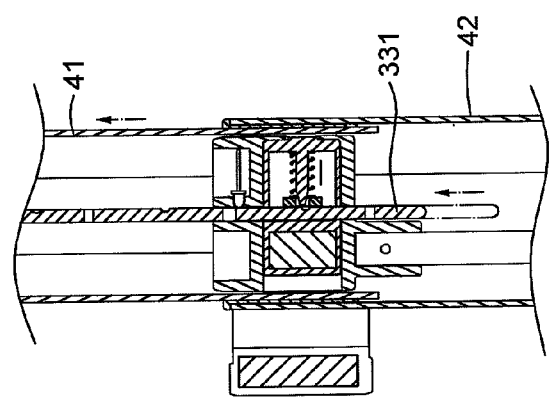
Figure 5:
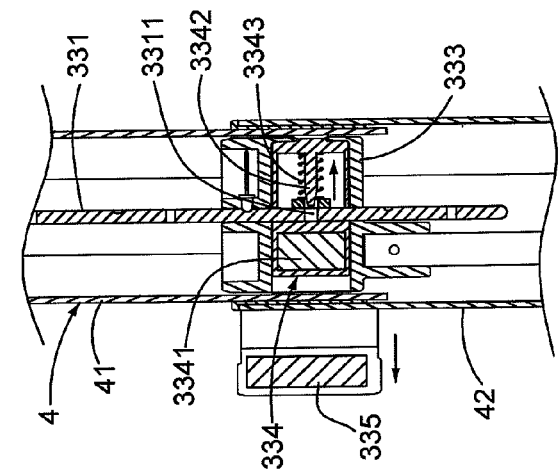

Referring to FIGS. 2, 5, and 6, when the height of the walking aid 4 is to be adjusted, the fastening unit 335 on the walking aid 4 is moved outward, so that the fastening unit 335 leaves the attraction of the magnetic member 3341. In the meantime, the moving member 334 is influenced by the elasticity of the first spring 3343, and the propelling member 3342 goes away from one of the fixing slots 3311. Accordingly, the upper shaft 331 is not fixed by the adjusting seat 333 anymore but influenced by the movements of the upper frame 41 and the lower frame 42. Namely, the total length of the upper shaft 331 and the lower shaft 332 is suited to the height of the adjusted walking aid 4.

Figure 7:
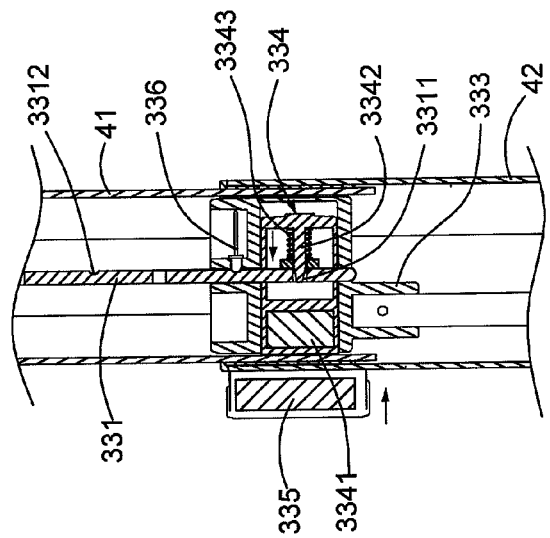
FIGS. 5 to 7 are schematic views showing the first preferred embodiment in operation.

Referring to FIG. 7, when the height of the walking aid 4 is adjusted, and when the striking sound is generated by the protrusion of the positioning member 336 into one of the positioning valleys 3312, the propelling member 3342 is suitably positioned in one of the fixing slots 3311. After that, the fastening unit 335 is moved toward the walking aid 4 and close to the walking aid 4. Namely, the fastening unit 335 goes back to the attraction of the magnetic member 3341. Moreover, the attraction between the magnetic member 3341 and the fastening unit 335 is larger than the elasticity of the first spring 3343, so the moving member 334 is influenced and moved toward the fastening unit 335, thereby allowing the propelling member 3342 to properly engage with the correspondent fixing slot 3311. As a result, the upper shaft 331 is fixed to the adjusting seat 333. Consequently, the braking grip 31 is clutched, the upper shaft 331 and the lower shaft 332 move accordingly, and the braking unit 32 timely functions. Herein, in view of the veiled disposition of the connecting unit 33 in the walking aid 4, the length of the connecting unit 33 is appropriately adjusted in accordance with the regulated walking aid 4. Therefore, the convenience of using is largely promoted.

Figure 8:
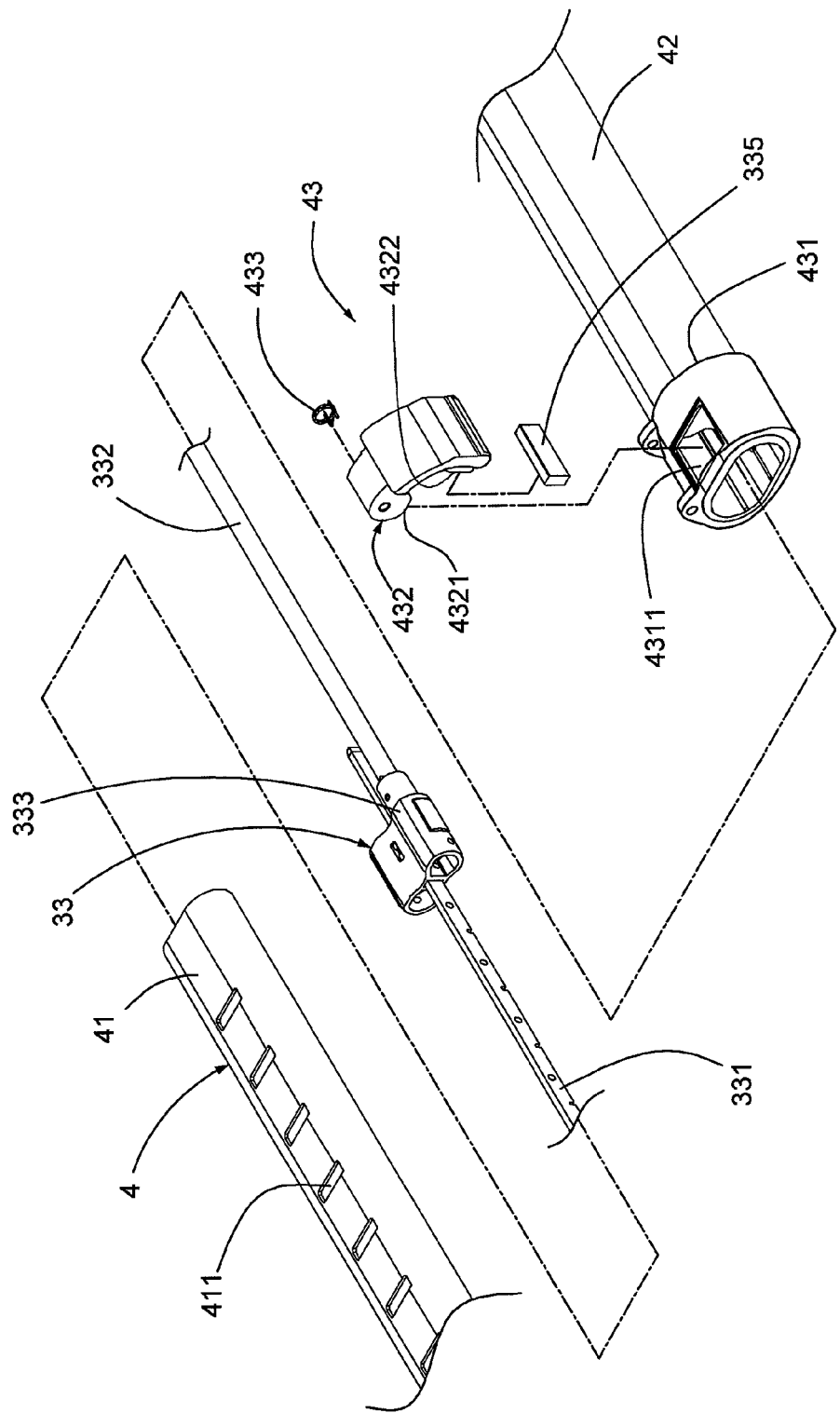
FIG. 8 is a partially exploded view showing a second preferred embodiment of the present invention.

FIG. 8 shows a second preferred embodiment of the present invention. Different from that in the first preferred embodiment, the fastening unit 335 and an adjusting unit 43 of the walking aid 4 are integrally structured. Moreover, a plurality of limiting slots 411 are equidistantly defined on the upper frame 41, and the adjusting unit 43 is in fact disposed on the lower frame 42. Herein, the adjusting unit 43 has a body 431 disposed on the lower frame 42 and defined with an accommodating room 4311, a lodging member 432 pivoted to the body 431 within the accommodating room 4311, and a second spring 433 disposed on the lodging member 432. The lodging member 432 has a block 4321 protruded thereon, and a chamber 4322 defined thereon. The fastening member 335 is received in the chamber 4322. Swinging the lodging member 432 concurrently influences the block 4321. Namely, the block 4321 stretches into the accommodating room 4311 and one of the limiting slots 411 for fixing. In the meantime, the fastening unit 335 is disposed corresponding to the magnetic member 3341 of the moving member 334. In this embodiment, the adjusting seat 333 of the connecting unit 33 is especially fixed to the lower frame 42.

Referring to FIG. 9, in operation, the lodging member 432 is swung for the block 4321 to leave the accommodating room 4311 and one of the limiting slots 411. Whereby, the fastening unit 335 goes away from the attraction from the moving member 334, so that the first spring 3343 is able to propel the moving member 334. Accordingly, the propelling member 3342 of the moving member 334 also deviates from the fixing slot 3311. Subsequently, the total length of the upper frame 41 and the lower frame 42 could be timely adjusted in accordance with the practical need. Please note that the upper frame 331 and the lower frame 332 of the connecting unit 33 are also correspondingly adjusted when the upper frame 41 and the lower frame 42 are regulated.

Accompanying with FIG. 10, when the height of the walking aid 4 is to be fixed, the accommodating room 4311 should be leveled at one of the limiting slots 411 defined on the upper frame 41. Whereby, the lodging member 432 is swung and pressed toward the accommodating room 4311 and the limiting slot 411. Accordingly, the elasticity of the second spring 433 disposed on the lodging member 432 allows the block 4321 to pass the accommodating room 4311 and also stretch into the limiting slot 411 for fixing. Namely, the upper frame 41 and the lower frame 42 are fixed and the fastening unit 335 on the lodging member 432 is attracted by the magnetic member 3341 again. As a result, the attraction between the fastening member 335 and the magnetic member 3341 allows the propelling member 3342 of the moving member 334 to be engaged in the suited fixing slot 3311. Also, the upper shaft 331 is also fixed to the adjusting seat 333, and the braking grip 31 is clutched for allowing the connecting unit 33 to influence the braking unit 32 so as to lessen the speed of the wheel set A. In short, the adjusting unit 43 and the connecting unit 33 allow an easy adjustment of the walking aid 4 to be attainable by simply utilizing the lodging member 432 to adjust the height of the upper frame 41 and the lower frame 42 as well as the upper shaft 331 and the lower shaft 332. Apparently, the height adjustment of the walking aid 4 becomes simplified, and the using convenience is also enhanced.

To sum up, the present invention in particularly utilizes connecting unit to make the fastening unit move toward the walking aid, so that the attraction between the fastening unit and the moving member allows the moving member to steadily protrude toward one of the fixing slots defined on the upper shaft. Whereby, the upper shaft is secured on the adjusting seat, and height of the walking aid could be swiftly adjusted. Moreover, when the adjusting unit is further applied, the upper frame and the lower frame as well as the upper shaft and the lower shaft could be simply regulated, which largely increases the using convenience.

While we have shown and described the embodiment in accordance with the present invention, it should be clear to those skilled in the art that further embodiments may be made without departing from the scope of the present invention.

I claim:

1. A hidden braking device installed on an adjustable walking aid including a braking grip, a braking unit controlling a rolling state of a wheel set, and a connecting unit connecting said braking grip with said braking unit;

wherein, said connecting unit is disposed inside said walking aid, and said walking aid has an upper frame and a lower frame that are suited to each other; said connecting unit having an upper shaft connected to said braking grip, a lower shaft connected to said braking unit, an adjusting seat connecting said upper shaft with said lower shaft, a moving member slidably disposed in said adjusting seat, and a fastening unit disposed out of said walking aid, correspondent with said moving member; a plurality of fixing slots being equidistantly defined on said upper shaft for satisfying an insertion of said moving member; one end of said moving member being provided with a magnetic member, and the other end of said moving member being provided with a propelling member which is disposed relative to said fixing slots; said fastening unit being magnetic for attracting said magnetic member, thereby allowing said moving member to displace for making said propelling member steadily insert and fix on any of said fixing slots.

2. The braking device as claimed in claim 1, wherein, a plurality of limiting slots are equidistantly defined on said upper frame, and an adjusting unit is disposed on the lower frame; said adjusting unit has a body that is disposed on the lower frame and provided with an accommodating room, a lodging member pivoted to said body within said accommodating room, and a second spring disposed on said lodging member; said lodging member has a block mounted thereon and a chamber defined thereon for receiving said fastening unit; swinging said lodging member allows said block to protrude toward said accommodating room and one of said limiting slots so as to fix said adjustable walking aid and make said fastening unit move to a place directing to said magnetic member of said moving member.

3. The braking device as claimed in claim 1, wherein, a first spring is disposed between said propelling member and said fixing slots.

4. The braking device as claimed in claim 2, wherein, a first spring is disposed between said propelling member and said fixing slots.

5. The braking device as claimed in claim 3, wherein, a plurality of positioning valleys are equidistantly defined on said upper shaft; an elastic positioning member is disposed on said adjusting seat for being able to partially protrude into one of said positioning valleys when said propelling member steadily inserts and fixes on any of said fixing slots.

6. The braking device as claimed in claim 4, wherein, a plurality of positioning valleys are equidistantly defined on said upper shaft; an elastic positioning member is disposed on said adjusting seat for being able to partially protrude into one of said positioning valleys when said propelling member steadily inserts and fixes on any of said fixing slots.

* * * * *